Aug. 26, 1969  D. E. BROUSSARD ET AL  3,463,518

SEALED PIPE COUPLING

Filed Aug. 22, 1967

INVENTORS:
DOUGLAS E. BROUSSARD
DEAN P. HEMPHILL
THOMAS J. BOLLING, JR.
THOMAS R. BEASLEY
ERSKINE E. ROACH

BY: J. H. McCarthy
THEIR AGENT

United States Patent Office 3,463,518
Patented Aug. 26, 1969

3,463,518
SEALED PIPE COUPLING
Douglas E. Broussard, Dean P. Hemphill, Thomas J. Bolling, Jr., Thomas R. Beasley, and Erskine E. Roach, Houston, Tex., assignors to Shell Oil Company, New York, N.Y., a corporation of Delaware
Filed Aug. 22, 1967, Ser. No. 662,366
Int. Cl. F16l 19/06, 19/08, 17/00, 21/02
U.S. Cl. 285—340                          8 Claims

ABSTRACT OF THE DISCLOSURE

A sealed pipe coupling having mating coupling members formed with shoulders to receive a frusto-conical shaped metallic sealing ring therebetween. One of the coupling members is formed with a wall of reduced thickness. As the coupling members are brought into mating relationship and joined by a threaded or flanged pipe connector, the sealing ring is caused to at least partially flatten thus deflecting the coupling member wall of reduced thickness and establishing a metal-to-metal seal between the coupling members.

BACKGROUND OF THE INVENTION

This invention relates to pipe couplings and more particularly to pipe couplings incorporating a fluid seal to prevent leakage into or out of the coupling.

The need for fluidtight couplings for joining pipes is widespread in industry and various seals and packings have been employed over the years with varying results. Generally, pipe joints rely on a compressible member which is squeezed between coupling members during assembly to effect a fluidtight joint. Typically, the seal is made of a softer material and is subject to being ruptured by high pressures. Furthermore, soft seals are subject to tearing during assembly and deterioration from aging or contact with chemicals.

There is a need in industry, and particularly in underwater completion work, for a metal-to-metal seal joint that would seal under rotary (swivelling) movement and at the same time withstand the combination loading of bending, pulling and pushing. The coupling must further be able to withstand high pressures and limited amounts of rotation between the pipes being coupled for long periods of time without leaking. In addition, the coupling must be as strong or stronger as the pipe to which it is attached and small enough to occupy a minimum of space.

This application describes a pipe coupling capable of meeting the above requirements.

SUMMARY OF THE INVENTION

In summary, the invention provides a pipe coupling having male and female coupling members one of which is formed with an end portion having a wall of reduced thickness. The coupling parts are adapted to carry an annular sealing ring therebetween of generally frusto-conical shape and being hard enough to deflect or flex the wall of reduced thickness when the coupling members are brought together. Suitable coupling connector means operatively engaging the coupling members serve to secure the members together and move one of said coupling members axially toward the other to thereby at least partially flatten the sealing ring and thereby cause the wall of reduced thickness to flex away from the ring.

In accordance with the invention a sealing ring having a generally frusto-conical shape is provided between two mating pipe coupling members. The members are designed to hold or trap the sealing ring between seats formed in each respective member in a manner such that when the coupling members are brought together the ring is forced to undergo an angular change, i.e., become flatter. At the same time, the distance between the seats formed in the respective coupling members effectively shortens and thus the ring, which is made from a hard relatively uncompressible material, attempts to maintain its original shape and thereby exerts a large sealing force against the coupling members and deflects at least one of the members away from the ring. Assembled, the joint provides a fluidtight seal between the inner and outer members by virtue of the metallic seals acting against the members without the need for any additional sealing or packing members. The sealing ring is relatively small thus resulting in a compact installation and furthermore it permits limited coaxial rotary or swivelling movement between the coupling members. Since the seal ring is not substantially deformed, the coupling members may be disassembled and the sealing ring re-used. The seal arrangement described is equally suitable for a static coupling wherein no relative movement is anticipated between the coupling members and operates in substantially the same manner. Thus, it will be seen that the subject invention meets a long felt need in industry and particularly in underwater completion work by providing a metal-to-metal seal in a coupling that will seal under rotary movement and at the same time withstand a combination loading of bending, pulling and pushing under high pressure for long periods of time without leaking. In addition, the coupling is as strong or stronger than the pipe to which it is attached and small enough to occupy a minimum of space.

DESCRIPTION OF THE PREFERRED EMBODIMENTS

Figure 1:
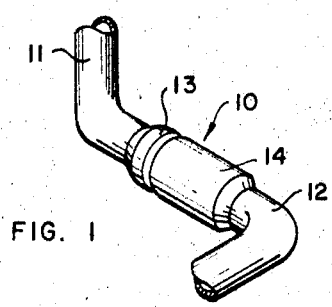
FIGURE 1 is a perspective view of the subject coupling joining two pipe segments and adapted to permit relative coaxial motion between the pipe segments.

Referring now to FIGURE 1, a swivel pipe coupling 10 incorporating the subject invention is shown interconnecting pipe segments 11 and 12. The pipe segments 11 and 12 may be a part of any piping system wherein a limited amount of coaxial rotation is desired between the pipe segments. For example, some swivelling between pipe segments is desirable in underwater work which must be performed remotely from the water surface. More specifically, pipe segment 11 could be a portion of a pipeline extending vertically up to the surface of the body of water and pipe segment 12 could be a portion of a pipeline adapted to lie along the floor of a body of water. It will thus be seen that the pipe segments 11 and 12, together with coupling 10, could be lowered with segments 11 and 12 in a vertical position onto the floor of the body of water and the pipe segment 12 pivoted (by virtue of the swivel action of coupling 10) into the position shown in FIGURE 1 to lie along the floor of the body of water. This is, of course, but one application where limited coaxial rotational movement is desired between connected pipes.

Other applications in processing equipment, pipelining and the like will be readily apparent to one skilled in the art.

Figure 2:
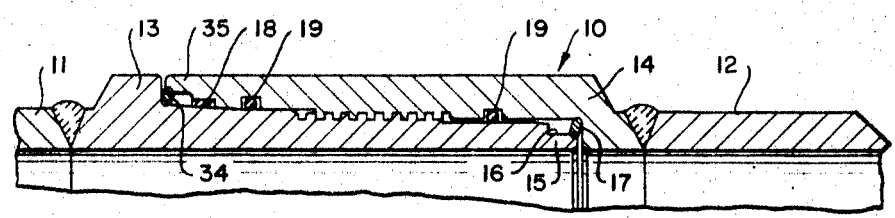
FIGURE 2 is a cross-sectional view of the coupling taken along its longitudinal axis.

The coupling 10 is further shown in cross-section in FIGURE 2. The coupling comprises two mating coupling parts 13 and 14 which may be formed integrally with the ends of pipe segments 11 and 12, respectively, or attached thereto by suitable means, for example, welding. Each part is provided with threaded portions along its mating surface to secure and interlock the members 13 and 14. It will be noted that each member is so constructed to provide an internal diameter consistent with the internal diameter of the pipe segments 11 and 12, thus providing a smooth non-restrictive flow path for fluid passing from one pipe segment to the other through the coupling. The male part of the coupling 13 terminates in an end portion 15 having a land 16 formed or machined about its outer periphery to thereby reduce the cross-sectional area of the end portion 15. Interposed between the end portion 15 of the male coupling member 13 and the female coupling member 14 is an annular sealing ring 17 which provides a fluid seal between members 13 and 14 in a manner to be hereinafter described. A similar sealing ring 34 may be interposed between an end portion 35 of female coupling member 14 and male coupling member 13. The design, function and operation of sealing ring 34 is the same as ring 17 and thus only a detailed description of ring 17 will be given. Additional seals may also be employed along the interface between parts 13 and 14, for example, a plastic seal 18 to prevent external fluids from entering the coupling and O-ring seals 19 located on each side of the threaded portion of the coupling to protect the thread; however, these seals are optional and thus they do not form a part of the present invention.

Figure 3:
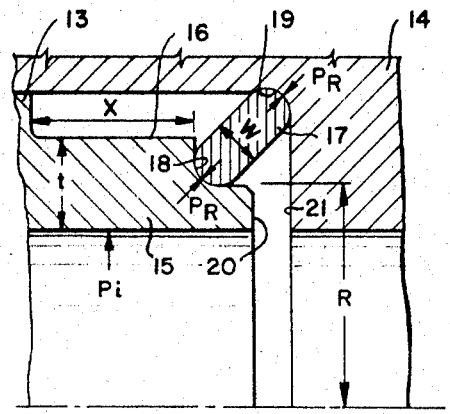
FIGURE 3 is a detail cross-sectional view of a portion of FIGURE 2 showing the sealing ring prior to the ring being loaded.
Figure 4:
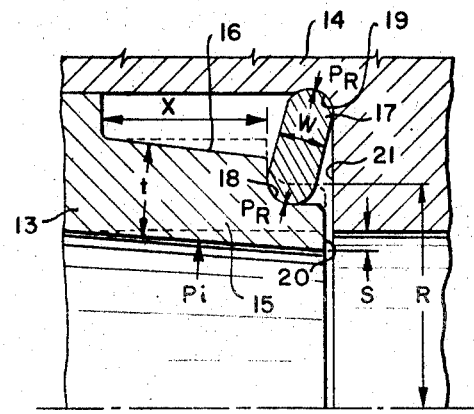
FIGURE 4 is the same cross-sectional view as FIGURE 3 after the coupling members are made up and the sealing ring is loaded.

FIGURES 3 and 4 are detail cross-sections of the coupling 10. FIGURE 3 shows the assembly when parts 13 and 14 are initially brought together and FIGURE 4 shows the assembly after parts 13 and 14 have been tightened.

Referring now to FIGURE 3 it will be noted that sealing ring 17, shown in its unstressed condition, is generally frusto-conical in shape. That is, it has a configuration generally equivalent to a portion of a 45° cone defined by two parallel planes passing perpendicularly through the axis of the cone. End portion 15 is provided with an annular seat 18 about its outer periphery to retain the radial seal 17. Similarly, part 14 is provided with a seat 19 at the point of contact with the radial seal 17. Similarly, part 14 is provided with a seat 19 at the point of contact with the radial seal 17. Thus, it will be seen that when the parts 13 and 14 are threaded together, radial seal 17 is effectively retained between the members by means of the seats 18 and 19. The major cross-sectional dimension of the radial seal 17 is greater than the distance shoulder 19 is radially displaced from shoulder 18 when the coupling is unstressed as shown in FIGURE 3. As used herein, the phrase radial displacement or radial displacement distance refers to the distance between the shoulders 18 and 19 measured perpendicularly from the centerline of the coupling members.

Referring to FIGURE 4, it will be seen that part 14 has been threaded further onto part 13 which thus decreases the effective distance between seats 18 and 19 causing the radial seal 17 to undergo an angular change as it flattens. The term "flatten" as used herein is intended to mean that the height of the sealing ring 17 is reduced or, considering the ring as a portion of a cone bounded by parallel planes as defined above, "flatten" means to reduce the distance between the planes. The seal 17 is preferably made of the same material as part 15 and member 14 but in any event is made of a material sufficiently hard to prevent the seal 17 from compressing sufficiently to take up the change in distance between the seats 18 and 19. Therefore, when the seal 17 flattens and undergoes the angular change, the seal exerts an inward force against seat 18. Since the end portion 15 of the coupling part 13 has less cross-sectional area than part 14 or the main body of part 13 by virtue of the land 16, the portion 15 will be deflected inwardly from its original position shown by the dotted line (which corresponds to its position in FIGURE 3) to a new position shown by the solid line in FIGURE 4. The natural elastic tendency of the end portion 15 to revert to its original shape develops a considerable sealing force acting against the seal 17 to thus provide a fluid seal between parts 13 and 14. The proportions of FIGURES 3 and 4 are somewhat exaggerated to better illustrate the deflection of end portion 15.

The use of the same material in making both the coupling members 13 and 14 and the radial seal 17 is particularly beneficial in cryogenic or high temperature applications since the coefficient of expansion of the seal and the coupling is the same thus minimizing warping or leaking during use.

The following calculations were used in the design of the subject invention and illustrate the high sealing force obtainable. Certain assumptions have been made which yield an approximate, rather than exact solution, but the results are satisfactory for practical purposes.

Referring to the symbols used in FIGURE 4 taken with the following known values:

means radius $R = 6$ in.
wall thickness $t = .750$ in.
material working stress $Sc = 30,000$ p.s.i.
material yield point $= 90,999$ p.s.i.
modulus of elasticity $E = 29 \times 10^6$ p.s.i.
Poissons ratio $\nu = .26$ we find from Roark, "Formulas for Stress and Strain," 3rd ed., pp. 268 and 271 (case 10) that $$S \text{ (deflection)} = \frac{V}{2D\lambda^3}$$

(uniform radial shear in lb. per linear inch of circumference exerted by radial seal)
where $$D = \frac{Et^3}{12(1-\nu^2)} = \frac{29 \times 10^6 (.750)^3}{12(1-.26^2)} = 1,075,000 \text{ in.-lb.}$$

and $$\lambda = \sqrt[4]{\frac{3(1-\nu^2)}{R^2 t^2}} = \sqrt[4]{\frac{3(1-.26^2)}{6^2(.750)^2}} = .61 \text{ in.}^{-1}$$

$$V = \frac{Sct}{2\lambda R} = \frac{30,000(.750)}{2(.61)6} = 3070 \text{ lb./in.}$$

further, according to Roark cited above, the maximum moment is developed at a distance X which equals $$\frac{\pi}{4\lambda} = \frac{\pi}{4(.61)}$$

therefore $X = 1.29$ in.

An approximation of $P_r$ (pressure between member 13–14 and radial seal 17) assuming $W = 3/16$ or .188 would be $$P_r = \frac{V}{W} = \frac{3070}{.188} =$$

16,300 p.s.i. when internal pressure $(P_i) = 0$

Assuming $P_i$ increases to 2000 p.s.i., then:

$$\Delta V_i = \frac{P_i x}{2} = \frac{2000(1.25)}{2} = 1250 \text{ lb./in.}$$

and $$\Delta P_r = \frac{\Delta V_r}{W} = \frac{1250}{.188} = 6660 \text{ p.s.i.}$$

therefore the maximum $P_r = P_r + \Delta P_r$ (when $P_i = 2000$ p.s.i.)

$$= 16,300 + 6660$$
$$= 22,960 \text{ p.s.i.}$$

Figure 5:
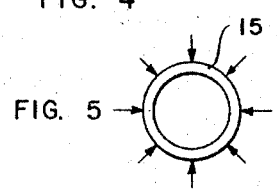
FIGURE 5 is a force diagram of the end of the inner coupling member.

The simple force diagram illustrated in FIGURE 5 shows an end view of the end portion 15 of coupling member 13 wherein the arrows represent the force exerted by the sealing ring 17. The sealing force created between the sealing ring 17 and the seats 18 and 19 will, of course, be varied by taking up or easing off on the threads interconnecting the coupling parts 13 and 14. This will cause the parts 13 and 14 to move axially with respect to one another and thereby vary the distance between shoulder 18 and shoulder 19. Since the sealing ring 17 must undergo an angular change when the relative positions of shoulders 18 and 19 are changed, the resultant deflection of end portion 15 of the coupling part 13 will change thus varying the effective sealing force.

For example, it is possible that the coupling parts 13 and 14 may be tightened to a point where a sealing ring 17 will become flat, or nearly so. This is permissible with the subject invention since the shoulder 19 will prevent the sealing ring from going over center and inverting. A positive stop may also be employed to limit the axial movement of coupling elements 13 and 14 to establish a maximum angular deflection for the sealing ring 17. For example, the end wall 20 may be designed to abut the wall 21 of coupling part 14 to thereby serve as a stop when the sealing ring 17 has undergone a desired angular change.

In the swivel coupling just described it will be noted that as the coupling is made up, that is, as it undergoes a transition from the position shown in FIGURE 3 to the position shown in FIGURE 4, coupling parts 13 and 14 are rotated relative to each other and thus the sealing ring 17 undergoes circumferential sliding contact with respect to shoulder 18 and/or shoulder 19. Therefore, any burrs or abrasive foreign matter on the sealing ring 17 or the shoulders 18 and 19 at the points of contact, may produce some abrasion or scoring of the ring or shoulders. However, any scoring on the sealing ring or mating shoulders will be radial and it has been found from tests that this does not affect the sealing capability of the coupling. This is believed to be due to the fact that any fluid attempting to leave or enter the coupling must pass by the seal in a direction perpendicular to any score lines and thus the grooves do not form a path to permit fluid leakage. This feature provides an additional advantage that the sealing ring and shoulders do not have to be accurately machined during fabrication of the coupling thus minimizing its cost.

The sealing ring 34 referred to above is in all respects the same as ring 17 except that end portion 35 of the female coupling member 14 is deflected outwardly by ring 34 whereas ring 15 deflects end portion 15 inwardly. In addition, either of the sealing rings 17 or 34 may be omitted without departing from the scope of this invention.

Figure 6:
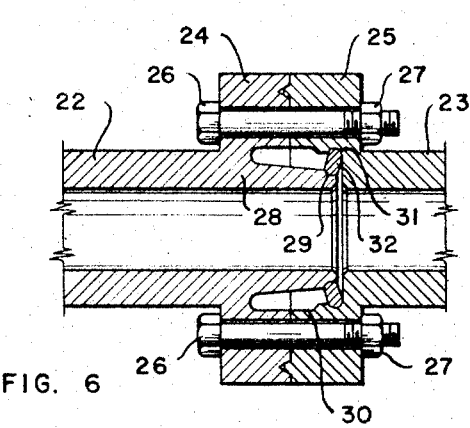
FIGURE 6 is a cross-sectional view of a modification of the subject invention as applied to a static pipe coupling.

The sealing arrangement described above with respect to the swivelling coupling 10 is equally applicable to a static pipe joint as shown in FIGURE 6. In this embodiment pipe segments 22 and 23 are formed with mating bolt flanges 24 and 25, respectively, which are secured by means of circularly spaced bolts 26 and knots 27. The mating face of pipe segment 22 and flange 24 is relieved to form a protruding male member 28 having a wall of reduced thickness and seal ring shoulder 29 formed about its outer periphery near the end of the male part 28. The mating surface of pipe segment 23 is partially bored out to provide a female recess 30 to receive the male part 28. The corner of the female recess 30 is provided with an annular shoulder or seat 31 which diagonally opposes seat 29 when the pipe segments 22 and 23 are coupled. A sealing ring 32 is carried between the seats 29 and 31 and functions in the same manner as the sealing ring 17 described above.

Assuming the pipe segments 22 and 23 are disassembled and is desired to make up the coupling, the sealing ring 32 is first placed in the female recess 30 where it is received by the seat 31. As pipe segment 22 is brought into mating contact with segment 23, seat 29 on the male portion 28 engages the sealing ring 32 in a manner similar to that shown in FIGURE 3. Bolts 26 and nuts 27 are then made up thus forcing the sealing ring 32 to undergo an angular change similar to that shown in FIGURE 4. The ring in turn exerts a force on the male portion 28 causing it to deflect inwardly. The arrangement provides a fluid sealed pipe coupling in the same manner as described with reference to the swivel coupling (see FIGURES 1–4).

Flanges 24 and 25 may be formed with suitable male and female portions on their mating surfaces to take up any external transverse mechanical loading between the flanges so that the radial seal 32 will not be damaged. In addition, other suitable static fastening means may be employed, for example, clamps, in place of the bolted flanges disclosed in FIGURE 6.

In each embodiment of the subject invention described above, the sealing ring may be made of a spring steel or other elastic material which will restore completely its original shape after undergoing an angular change. Thus, when the coupling is disassembled the sealing ring is still usable and the coupling may then be reassembled using the original parts.

Having thus described the invention what we claim is:

We claim as our invention:

1. A coupling for connecting two pipes in end-to-end relationship, said coupling comprising:

first and second mating coupling members;

said first coupling member being formed with a male portion;

said second coupling member being formed with a female portion adapted to mate with said male portion of said first coupling member;

one of said portions having a wall of reduced thickness at the end thereof and a first annular shoulder formed thereon;

the other of said portions being formed with a second annular opposed shoulder radially displaced from said first shoulder;

an annular sealing ring having a generally frusto-conical shape in its unstressed condition and being adapted to be carried between said shoulders;

said ring having a major cross-sectional dimension greater than the radial displacement distance between said shoulders when said coupling members are mated in an unstressed condition and said ring being of a sufficient thickness and hardness to flex said wall of reduced thickness away from the opposed coupling member a distance substantially equal to the difference between said major cross-sectional dimension of said ring and said radial displacement distance between said shoulders;

said wall of reduced thickness being thin enough to be flexed by said ring when said coupling members are mated; and, connector means operatively engaging said first and second coupling members to secure said members together and move said coupling member axially toward each other a distance at least sufficient to at least partially flatten said sealing ring and thereby cause said wall of reduced thickness to flex away from said other coupling member.

2. A coupling as defined in claim 1 wherein said sealing ring is metallic.

3. A coupling as defined in claim 2 wherein said portion having a wall of reduced thickness is said male portion.

4. A coupling as defined in claim 2 wherein said portion having a wall of reduced thickness is said female portion.

5. A coupling as defined in claim 2 wherein said connector means comprise interengaging threads formed in said coupling members.

6. A coupling as defined in claim 2 wherein said connector mating flanges formed on said coupling members and fastening means connecting said flanges.

7. A coupling as defined in claim 2 wherein said coupling members have an internal diameter substantially equal to the internal diameter of said pipes being coupled.

8. A coupling as defined in claim 2 wherein said sealing ring is made of spring steel.

References Cited

UNITED STATES PATENTS

| 2,202,491 | 5/1940 | Jacocks | 285—340 |
| 2,992,840 | 7/1961 | Reynolds et al. | 285—340 |
| 3,365,219 | 1/1968 | Nicolaus | 285—340 |

DAVID J. WILLIAMOWSKY, Primary Examiner

W. L. SHEDD, Assistant Examiner

U.S. Cl. X.R.

285—363, 405, 382